(12) United States Patent
Greene

(10) Patent No.: US 9,977,514 B1
(45) Date of Patent: May 22, 2018

(54) METHOD AND APPARATUS FOR DIGITAL PAINTING WITH NATURAL TEXTURES

(71) Applicant: Richard Martin Greene, San Rafael, CA (US)

(72) Inventor: Richard Martin Greene, San Rafael, CA (US)

( * ) Notice: Subject to any disclaimer, the term of this patent is extended or adjusted under 35 U.S.C. 154(b) by 308 days.

(21) Appl. No.: 14/082,148

(22) Filed: Nov. 17, 2013

Related U.S. Application Data

(60) Provisional application No. 61/733,896, filed on Dec. 6, 2012.

(51) Int. Cl.
*G06F 3/03* (2006.01)

(52) U.S. Cl.
CPC .................. *G06F 3/0325* (2013.01)

(58) Field of Classification Search
CPC .. G06F 3/0412; G02F 1/1338; G06K 9/00187
See application file for complete search history.

(56) References Cited

U.S. PATENT DOCUMENTS

| | | |
|---|---|---|
| 4,561,017 A | 12/1985 | Greene |
| 5,181,108 A | 1/1993 | Greene |
| 8,022,927 B1 | 9/2011 | Greene |
| 8,085,351 B2 | 12/2011 | Takahashi et al. |
| 8,189,128 B2 | 5/2012 | Takahashi et al. |
| 2009/0231511 A1* | 9/2009 | Takahashi et al. ............ 349/61 |
| 2010/0302203 A1* | 12/2010 | Tsuzaki et al. ............... 345/174 |
| 2013/0229357 A1* | 9/2013 | Powell .................. G06F 3/0412 345/173 |

OTHER PUBLICATIONS

Hodges et. al., "ThinSight: Versatile Multi-touch Sensing for Thin Form-factor Displays", Proceedings of the 20th annual ACM symposium on User interface software and technology, Oct. 7, 2007, pp. 259-268, ACM, New York, NY, USA.
Greene, "The drawing prism: a versatile graphic input device", SIGGRAPH Computer Graphics, Proceedings of the 12th annual conference on Computer graphics and interactive techniques, Jul. 1985, pp. 103-110, vol. 19 Issue 3, ACM, New York, NY, USA.

* cited by examiner

Primary Examiner — Dennis Joseph

(57) ABSTRACT

The invention provides a digital painting apparatus and method that captures the natural textures in physical painting tools. It is comprised of a plurality of sensors below a painting surface and a light source arranged such that reflective objects near the sensors are imaged, with the nearer parts of the objects forming brighter parts of those images. The images are thresholded to include only the parts of those objects nearest the painting surface and accumulated in a display buffer to leave painted strokes that preserve those textures as the objects are moved. A display is located below the painting surface, substantially coincident with the sensors, and feedback from the display is substantially removed from the sensor images before they are thresholded, providing more uniform sensitivity.

**4 Claims, 11 Drawing Sheets
(6 of 11 Drawing Sheet(s) Filed in Color)**

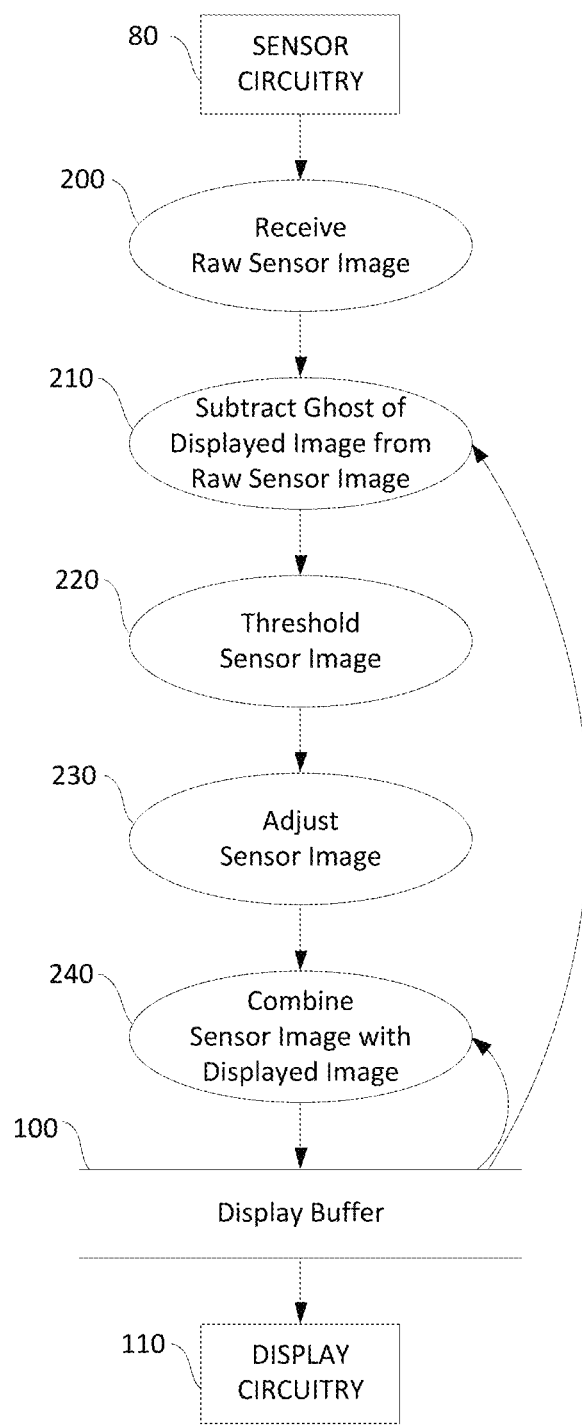

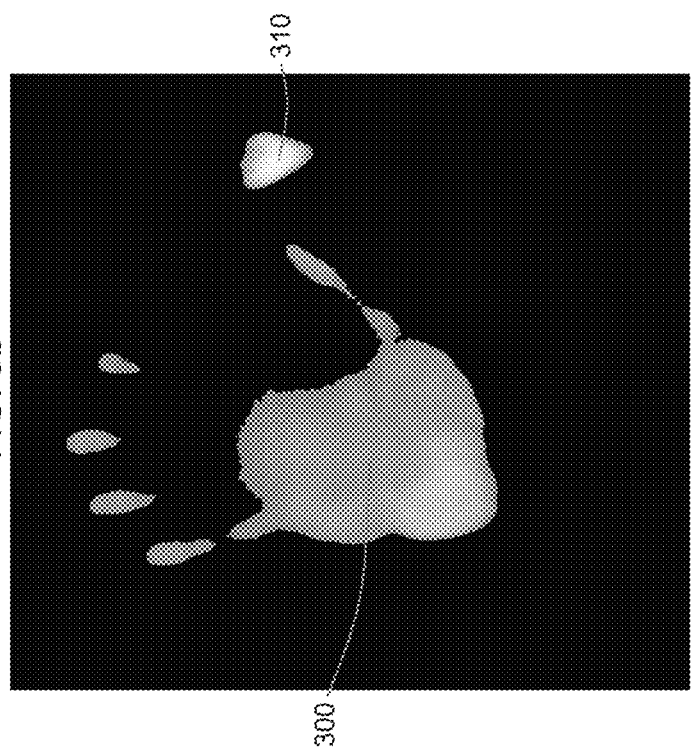
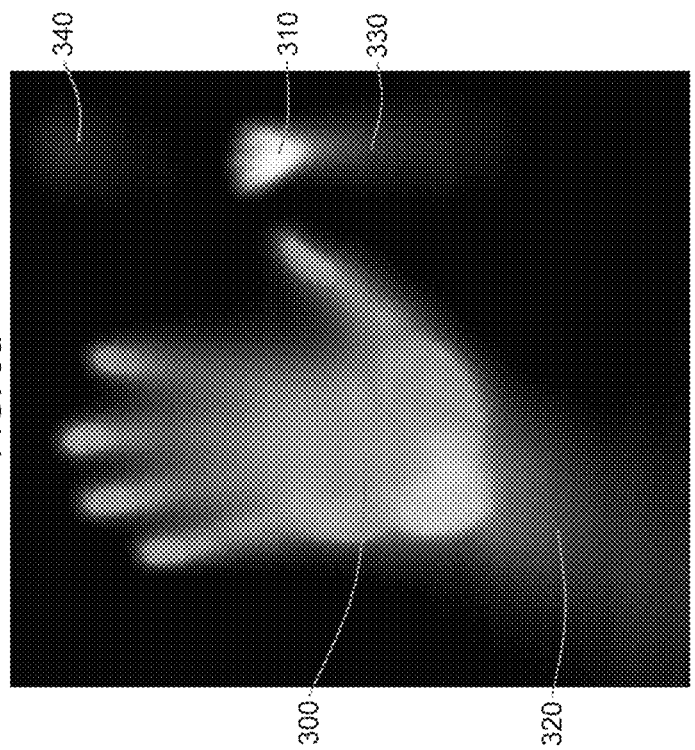

METHOD AND APPARATUS FOR DIGITAL PAINTING WITH NATURAL TEXTURES

CROSS-REFERENCE TO RELATED APPLICATIONS

This application claims priority from U.S. Provisional Patent Application Ser. No. 61/733,896 filed Dec. 6, 2012, the disclosure of which is incorporated here by reference.

BACKGROUND OF THE INVENTION

Conventional digital paint systems use a graphic input device that tracks the position of a stylus and a processor that connects those points with lines in a display buffer. Some input devices can track the positions of multiple objects near their sensitive surface based on their images, as described by Hodges et. al in "ThinSight: Versatile Multi-touch Sensing for Thin Form-factor Displays" (Proceedings of the 20th annual ACM symposium on User interface software and technology, 2007, pp. 259-268) and Takahashi et al. in U.S. Pat. Nos. 8,085,351 and 8,189,128, the disclosures of which are incorporated by reference. That technology is embodied in a system manufactured by Samsung (Seoul, South Korea) called the SUR40, which includes software provided by Microsoft (Redmond, Wash.). In such systems, as the images of nearby objects are captured over time they are segmented and each segment is approximated by an ellipse whose position, size and orientation changes over time as the objects are moved. A paint system may then draw those ellipses that approximate the images of nearby objects such as fingers and brushes and connect the ellipses at successive positions of the object with lines, whereby the shape of the painted strokes more accurately reflects the changing shape of the objects.

In devices such as the SUR40 the painted image in progress may then also be displayed on the same surface, coincident with the input, and the device may be made very thin. However, because of feedback from the display to the sensitive portions of that surface, ghost images of the displayed output can appear in the input. This feedback causes nonuniformity in the responsiveness of such devices. The ghost images make them more sensitive to input where the displayed output is brighter and less sensitive where it is darker.

Other paint systems use the raw images of objects in optical contact with a drawing surface to provide their input, as described by Richard Greene in "The drawing prism: a versatile graphic input device" (ACM SIGGRAPH, Proceedings of the 12th annual conference on Computer graphics and interactive techniques, 1985, pp. 103-110) and U.S. Pat. Nos. 4,561,017, 5,181,108, and 8,022,927, the disclosures of which are incorporated by reference. When nothing is in contact with that surface, a background is imaged by total internal reflection (TIR). Only the portions of objects in optical contact with the surface, where there is no intervening layer of air to create TIR, are thereby imaged. Those images are then processed and accumulated in a display buffer to yield strokes that can capture the changing shape, texture, and shading of the areas of contact. While such systems provide a more expressive medium than those that only capture the positions or approximating ellipses of drawing tools, they also have some drawbacks. First, they require considerable depth below the drawing surface for their optical path, and that depth increases with the size of the active drawing surface. Second, they require the drawing tools to be wet, in order to eliminate the layer of air that provides TIR. Finally, they do not provide a means for locating the input coincident with the display of the image as it is being painted. Therefore users are forced to look away from the drawing tool in order to see the display of the painting itself. Also, when they first touch the tool to the drawing surface, they cannot tell exactly where in the painting that will leave its mark, until after they see where that mark was made.

Devices such as the SUR40 detect portions of objects that may be inches from their sensitive surface. They do not just detect the portions of objects in optical contact with that surface, i.e. where there is no air between the object and the surface.

BRIEF SUMMARY OF THE INVENTION

The invention provides an apparatus and method for digital painting that can capture the natural textures of hands, brushes, and other painting tools in a thin input device that can be located substantially coincident with the display of the painted images in progress. A natural texture is any spatial and/or temporal inhomogeneity in the light reflected from those physical tools due to their shape, material composition, shading, and/or disposition. The painting tools may be wet, but they do not need to be. It employs a light source and multiplicity of light sensors as an input device, whereby objects near the sensors reflect some of that light back to the sensors, and the sensors detect that light if the object is sufficiently close. It further employs a processor that accepts only the brighter portions of those images, corresponding to the closer portions of those objects, and that accumulates in a display buffer the processed images of the objects as they are moved. In that way, the natural textures of those objects are captured in strokes forming a digital painting that may be displayed, printed, and otherwise shared.

The invention further provides means to substantially remove the effects on the input of ghost images of the displayed output, when the display is located coincident with the input device. This provides more uniform input sensitivity, regardless of the images being displayed.

More specifically, a digital paint system is disclosed which includes a multiplicity of light sensors arranged in a matrix, that provides signals proportional to the amount of light incident upon each sensor. These signals are digitized and read into a digital processor. The system also includes a light source that illuminates objects near the sensors and a transparent material that provides a painting surface. The light source is positioned such that the sensors can detect some of that light reflected from such objects, while remaining relatively insensitive to direct illumination from that source, and such that the closer the object is to the painting surface, the greater the amount of light reflected to the sensors. The system further includes a display buffer large enough to hold the digitized signals from the sensors. The processor then discards the sensor signals that do not exceed a threshold, retaining only the brighter portions of the image, corresponding to the nearer portions of the objects. The processor stores those brighter portions of the initial image in the display buffer. As the objects are moved and the processor reads successive images of them, it combines the brighter portions of those images with the previous contents of the display buffer, and stores that composite image back in the buffer. In that way, as objects are held near the painting surface and moved substantially parallel to the plane of the sensors, they leave trails in the image stored in the display buffer that retain characteristics of the dynamic shapes, shading, and texture of those objects. When the objects are hands, brushes, or other painting tools, the final image therefore preserves subtle details of the movement that produced it, that are not preserved in paint systems that merely record an approximating ellipse. The invention thereby provides a very expressive apparatus and method for digital painting using natural textures, in which those textures can strongly influence the final painting.

In the preferred embodiment, the input device is integrated with a display that occupies the same area. The light source and sensors use invisible wavelengths of light, such as infrared, to facilitate that integration. The display is positioned such that its elements form a matrix adjacent the sensor matrix, with display elements alternating with sensors in a thin panel. In that way, when the display is driven by the display buffer that stores the digital painting in progress, the virtual "paint" appears to flow directly from the brush or other painting tool, much like when painting with real physical paint.

However, when the display is combined with the sensors in that way, the displayed output can feed back into the input, causing "ghost" images in that input. That is because even though the sensors are primarily sensitive to invisible wavelengths and the display operates primarily in visible wavelengths, there can be enough overlap in their respective absorption and emission or transmission spectra that the sensors generate an erroneous signal due to light from nearby display elements. In order to reduce or remove that error, a predetermined proportion of the known output from those surrounding display elements is subtracted from the signal from each sensor.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

The preferred embodiment of the invention will be further described in connection with the accompanying drawings, in which:

FIG. 2 is a data flow diagram of the preferred processing pipeline; and

FIGS. 3a and 3b are sensor images before and after thresholding; and

DETAILED DESCRIPTION OF THE INVENTION

Figure 1:
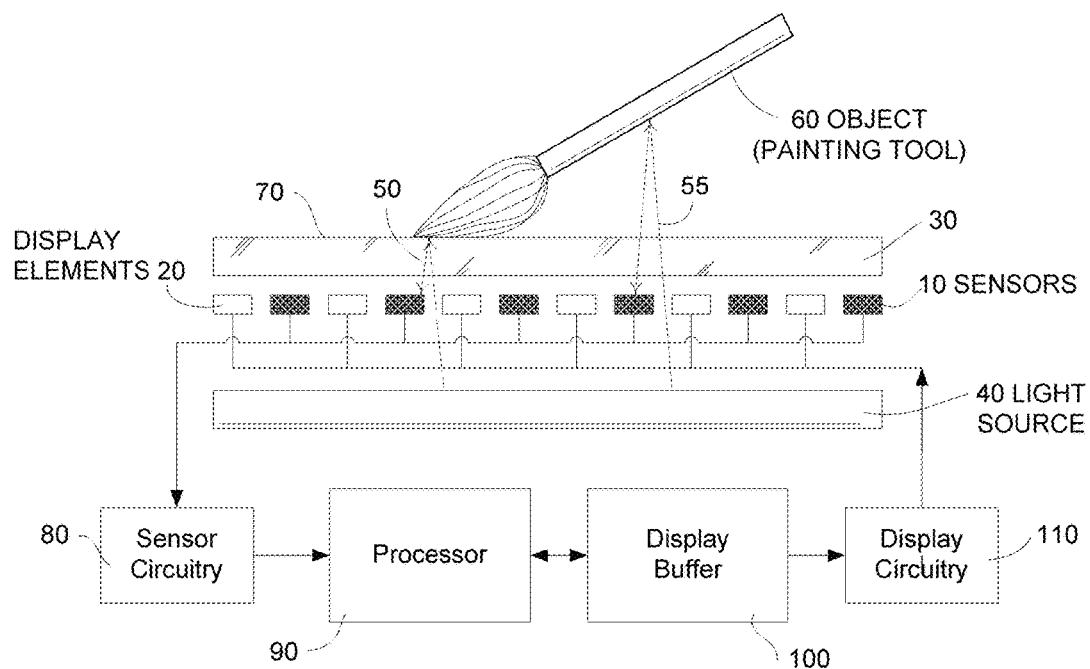
FIG. 1 is a schematic showing of the preferred painting apparatus.

The preferred construction of the device is shown schematically in FIG. 1. A plurality of light sensors 10 is disposed in alternating fashion adjacent to a plurality of display elements 20. The light sensors may be phototransistors, photodiodes, photoresistors, photovoltaics, microbolometers or any other device that produces an electrical signal whose magnitude increases with increasing illumination, in a linear or non-linear proportion, i.e. in a direct relation. Even if the sensor is used in an inverted configuration, in which an increase in illumination causes e.g. a decease in electrical current or voltage, the magnitude of the signal corresponds to the absolute value of that change, such that it still has a direct relation to the illumination. In the preferred embodiment the sensors are maximally sensitive to light that is not visible to the human eye, such as infrared or ultraviolet, and filters (not shown) may be used to limit the wavelengths to which they respond. The display elements may be emitters of light such as light-emitting diodes (LEDs), organic LEDs (OLEDs), or plasma display cells, or they may be light valves such as liquid crystal display (LCD) pixels that vary the amount of external illumination passing through them. They may be monochromatic or multicolored. In the preferred implementation each display element is capable of emitting or transmitting variable amounts of red, green, and blue (RGB) light, so that the display may provide a wide range of colors, i.e. it may be regarded as a full-color display.

Shown in cross-section in FIG. 1, a protective sheet 30 of a clear material such as plastic or glass covers the sensors and display and a light source 40 illuminates this sheet from below. The light source is comprised of incandescent lamps, fluorescent lamps, LEDs, or other emitters, and in the preferred embodiment they supply wavelengths of light to which the sensors are most sensitive, such as infrared. The light source may also provide the visible wavelengths needed by the display elements if the display is of the type that requires external illumination, such as an LCD. The sensors are oriented and/or provided with shielding (not shown) such that they are not directly illuminated by the light source. Instead, the sensors are most sensitive to light rays such as 50 from the source that pass through the spaces and/or the display elements between the sensors and reflect back to the sensors from objects 60 above the protective sheet and in close proximity to it that serve as painting tools. Because the intensity of that reflected light decreases as the object is moved further from the protective sheet, the sensors are most sensitive to reflective objects, or the portions of those objects, nearest to the upper surface 70 of that transparent sheet, which serves as the drawing or painting surface. For example, rays such as 55 must traverse a greater distance from the source to a part of the object well above the painting surface and from the object back to the sensor, such that even if the reflectance of the object is uniform, the intensity at the sensors from rays such as 55 will be less than from rays such as 50, resulting in a weaker signal from the sensors. In other words, the magnitude of each sensor signal has an inverse relation to the distance of the object from that sensor.

The sensors are connected to sensor circuitry 80, which scans the matrix of sensors, conditions the signal from each one and digitizes it. A processor 90 reads the digitized signals from the sensors. The processor may be the central processing unit (CPU) or the graphics processing unit (GPU) in a general purpose digital computer, or the processing may be shared by both the GPU and CPU. In the preferred embodiment, the CPU controls the GPU, such that most of the image processing is performed in the GPU, as quickly as possible. Alternatively the processor can be a more specialized digital image processor.

The processor is connected to a display buffer 100 such that it may both write to it and read its contents. The display buffer is a portion of memory that holds an image that can be displayed. That memory may be general purpose random access memory (RAM) or dedicated memory. It may be located internal to the CPU or GPU or elsewhere that is accessible to the processor. It is at least large enough to hold the entire digitized sensor image, and in the preferred embodiment is large enough to hold an entire full-color image for display.

The display buffer is connected to display circuitry 110 that converts the digital representation of each picture element or pixel in the display buffer into an analog signal and that scans the display. It thereby drives each of the display elements 20 as needed to provide a visible image on the display of the contents of the display buffer.

The Samsung SUR40 is an embodiment of the device described above with respect to FIG. 1 (except for the painting tool objects themselves and the specific processing performed by the processor). It provides a 40 in. (diagonal) backlighted LCD that is only 4 in. thick, with a matrix of 1920 by 1080 RGB display elements. Its processor is an AMD (Sunnyvale, Calif.) Athlon X2 Dual-Core 245e 2.9 GHz CPU along with an AMD Radeon HD6750M display adapter which provides a GPU as well as a full-color display buffer (with 1 GB RAM). It also includes an infrared light source and matrix of infrared sensors arranged in alternating fashion with the display elements. The software driver that provides the sensor data to software applications running on the processor presents it as an image that is half the display resolution in each dimension, apparently by combining the signals from adjacent sensors for improved noise immunity. Thus it provides a 960 by 540 monochrome image with 8 bits per pixel (BPP) which must be scaled by a factor of two in each dimension, in order to align with the display.

Details of the Processing Pipeline

What distinguishes the preferred embodiment from the prior art embodied in the SUR40 is the processing that enables digital painting with natural textures and more uniform sensitivity, which is shown as a data flow diagram in FIG. 2. It should be noted that FIG. 2 illustrates only one possible process implemented in the processor 90 shown in FIG. 1. The process begins and repeats every time a new image from the sensor circuitry 80 is available to be read into the processor. At that point the processor receives the raw image 200. Although these images are referred to as "raw," it will be understood that the sensor circuitry and low-level driver software (not shown) may have already performed some processing on those images before providing them to the pipeline shown in FIG. 2. Some examples of such possible pre-processing are normalization to reduce the effects of ambient illumination, lookup table mapping for gamma correction, and filtering to reduce noise.

Since in the preferred embodiment each sensor is surrounded by display elements, and since the sensors are somewhat sensitive to the light from those display elements, the image from the sensors includes, in addition to the desired images of painting tools, an undesired "ghost" of the image currently being displayed. Such erroneous ghost images due to feedback from the display will be present unless an all-black image is being displayed (or if no display is integrated with the input device). In order to remove that error, an amount is calculated at each sensor image pixel corresponding to the expected display feedback at that location, and that amount is subtracted 210 from the value of that sensor image pixel. The expected display feedback at each sensor location is based on the known color and intensity of the image currently displayed around it and the previously measured proportion of that light that contributes to the ghost image, as described in further detail below.

The next step is to apply a threshold 220 to the corrected sensor image, in order to reduce the effects on the painting of portions of objects which are near to but not actually touching the painting surface. The threshold is applied by setting all pixels in the sensor image whose values are below that threshold to 0, i.e. black. Pixels with values above or equal to the threshold are not changed during the thresholding process. The threshold can be any value between 0 and the maximum possible value of the brightest sensor image pixels. With the SUR40, a threshold value near the middle of that range is effective. Thus for its 8 BPP monochromatic sensor images, where each pixel can have any gray level from 0 (black) to 255 (white), a threshold of 128 may be used.

For example, FIG. 3a is an 8 BPP monochromatic sensor image from the SUR40 of a person's hand 300 and of a white brush 310, while both were touching its sensitive surface. Those portions of the image were formed by rays with relatively short paths, such as 50. The image also shows part of the person's arm 320 and the handle 330 of the brush, which are each well above that surface, as well as another white brush 340 held about ¼ inch above that surface. Those parts of the image were formed by rays with longer paths, such as 55. FIG. 3b shows the effects of thresholding the sensor image, with a threshold of 128. The arm, brush handle, and brush held above the surface are no longer visible in FIG. 3b, while the parts of the hand 300 and brush 310 that were in direct contact with the painting surface, or nearly so, remain in the thresholded image.

The preferred value of the threshold will depend on factors such as the sensitivity of the sensors, their distance to the painting surface, and the amount of ambient illumination. It will also depend on the reflectance of users' hands, clothing, and other objects well above that surface, that should be excluded from the image, as well as the reflectance of the painting tools whose images are to be included. When ghost images have been reduced or removed, the threshold can be lower than it would need to be in the presence of that feedback, thereby preserving more of the dynamic range available in the sensor signals. With the SUR40, a single fixed threshold value applied to every pixel in every sensor image is effective. However, in cases where the sensitivity varies in known ways across the image and/or in successive images, the threshold can likewise be made to vary over spatial location and/or time.

It should be noted that whereas prior art paint systems such as those described by Greene also make use of thresholds, they are of a different magnitude and are used for a different purpose. In that prior art, no threshold was needed to distinguish the parts of objects nearest the drawing or painting surface because TIR prevented the view of anything else but a black background. To the extent that that background was not uniformly black, a small threshold could be applied to prevent dust and other such slightly brighter portions of the background from interfering with the painting process. In the present invention, the threshold does not simply remove such background noise. Instead, the thresholding process in the present invention is essential for distinguishing the portions of painting tools nearest the painting surface, since it does not use TIR for that purpose.

Returning to FIG. 2, at this point in the processing pipeline, the sensor image substantially contains only the images of the portions of objects that are either in physical contact with the painting surface or very nearly so. However, the thresholding process also effectively reduces the dynamic range of those images. Therefore in the preferred embodiment the sensor images are further adjusted 230, to stretch their intensity range to cover the range of values that may be represented in the sensor image of a given bit depth. For example, given an 8 BPP monochromatic sensor image and a threshold of 128, half the dynamic range will be lost. By subtracting 128 from the value of each sensor image pixel that is at or above the threshold and multiplying the result by two, almost the complete dynamic range may be restored, albeit with no odd-numbered intensity values remaining in the image. Other processing can also be applied as part of the adjustment 230, such as lookup table mapping or filtering, in order to correct for distortions or other errors. Adjustments can also be applied to provide various artistic effects. For example, dividing the sensor image intensity values by a transparency factor can be used to provide a translucent effect in the digital paint to be applied.

Next, the processed sensor images are combined 240 with the current image in the display buffer, in order to accumulate a record of the successive sensor images over time. This accumulation may be performed in different ways according to the desired painting effect, as described in further detail below. Regardless of the specific method of accumulation, the combined image is written back and stored in the display buffer 100, whence the display circuitry 110 sends it to the display.

This process is repeated every time a new image is available from the sensor circuitry 80. In the preferred embodiment, new images become available at least 60 times per second and all of the processing shown in FIG. 2 is executed in less time than the time between successive new images. In that way, as tools are moved across the painting surface, their most recent images are accumulated with their predecessors, such that they leave trails or strokes in the display buffer image. A painting is thereby built up that reflects the movement of those tools along with their natural and dynamic shapes, shading, and texture.

Details of Accumulation in Display Buffer

Figure 4A:
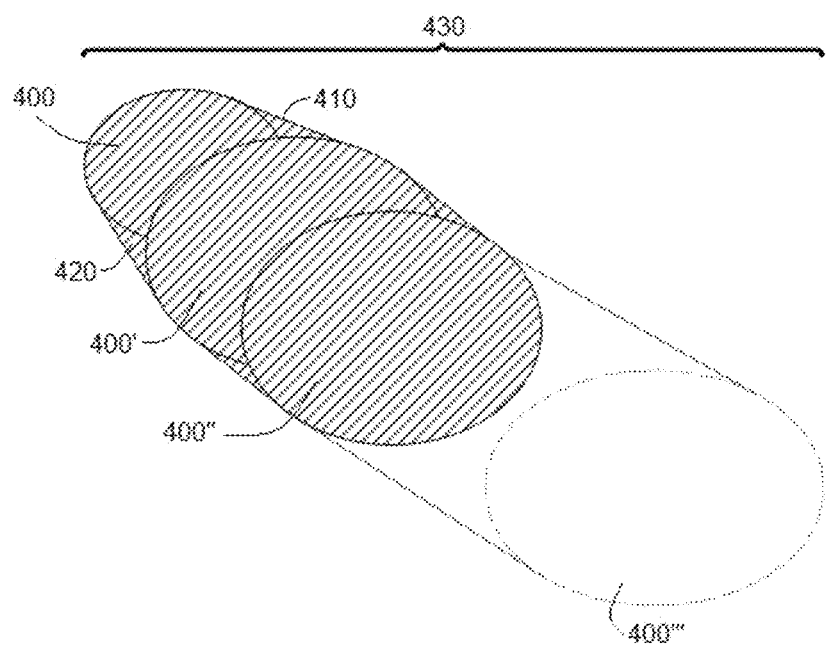
FIGS. 4a and 4b show prior art processing.

The way that the images of moving objects in contact with the painting surface are combined into a painting with natural textures in the preferred embodiment differs from prior art paint systems such as those implemented on the SUR40. FIG. 4a shows the process used in such prior art paint systems, in which the shape of a painting tool at its initial position was read from the sensors and approximated by an ellipse 400. As the tool was moved and the sensors captured images of it at successive locations 400' and 400", each of the successive approximating ellipses was connected to the previous one by lines 410, and the spaces 420 between the lines and the ellipses, as well as the ellipses themselves, were filled in with, for example, a uniform color. The painted stroke 430 is then continued when the next approximating ellipse 400''' is found, and it too is connected to the previous ones, and so on until the tool is lifted out of range of the sensors, ending the stroke. The successive ellipses may overlap or not, depending on their sizes, the speed at which the tool is moved, and the rate at which the sensor images are processed.

Figure 4B:
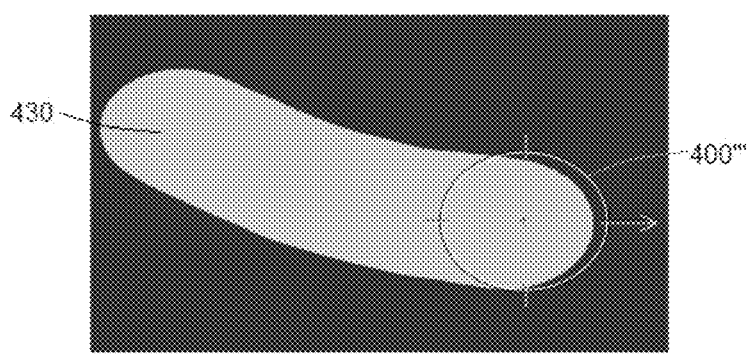

FIG. 4b is an example of such a prior art stroke 430, created using the PhotoPaint sample application provided by Microsoft in their Surface 2.0 Software Development Kit (SDK) for the SUR40. The screen image was captured while using the Input Visualizer tool, also included with that SDK, which in FIG. 4b shows the next approximating ellipse 400''', which the PhotoPaint application has not yet connected to the rest of the stroke.

In addition to strokes of a single uniform color, prior art digital paint systems provide variegated strokes taken from external image sources and/or supplied by processes such as pseudorandom noise. In that way, they can apply visual textures to the painted strokes. However, those textures are not natural, in that that they do not depend on the specific shape, shading, and other material properties of the painting tools themselves and the ways in which those tools are moved and manipulated by the user while painting. Since those characteristics of the tools are discarded when their images are approximated by ellipses, a record of those textures cannot be preserved in the paintings created with prior art paint systems that rely on those approximations.

By contrast, the preferred embodiment of the present invention does preserve in painted strokes those natural characteristics of the tools and their changes during the painting process. There are many ways in which the thresholded and adjusted sensor images may be combined with the contents of the display buffer and accumulated in order to build up such strokes. It is possible to ignore the current contents of the display buffer and simply replace them with some new value at every pixel where the corresponding pixel in the thresholded sensor image is non-zero. That value can be a constant, representing a desired paint color, or it can be the value of the sensor image pixel, or some function of those values. In any case, accumulative processes that do not take into account the existing values in the display buffer tend to produce strokes with jagged or aliased edges.

Figure 5:
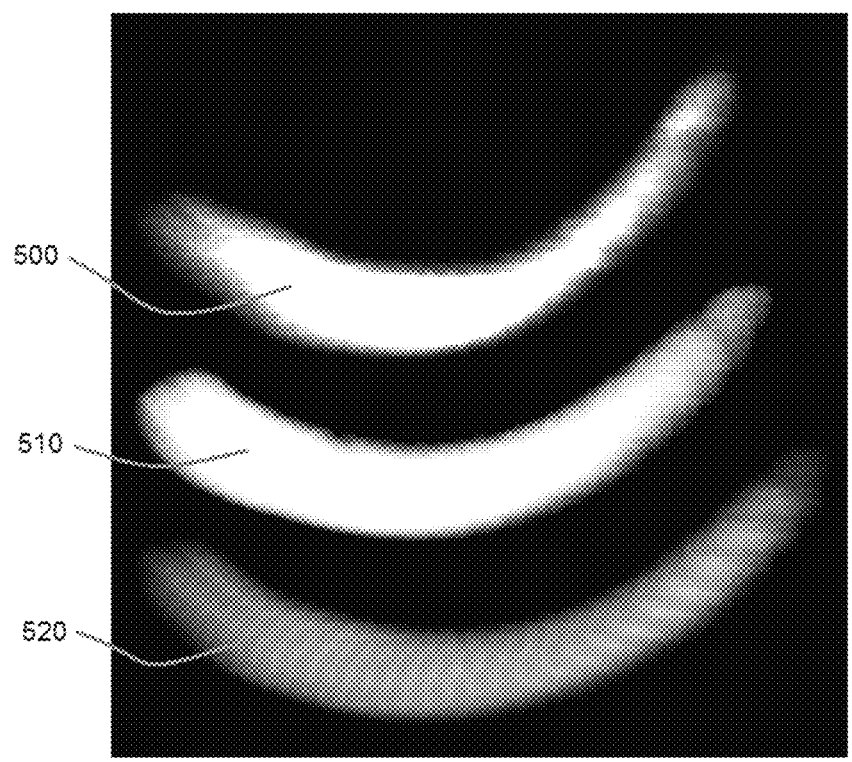
FIG. 5 shows the preferred processing.

A simple process that does take into account those pre-existing values is to add each new thresholded sensor image to the current contents of the frame buffer, with saturation or clamping to the maximum possible value. We can represent this process by the following equation, executed at each pixel:

$$D_{final} = \text{Min}(D_{current} + S, I_{max})$$

Where $D_{final}$ is the final value of the destination pixel in the display buffer, $D_{current}$ is the current value for that same pixel, S is the value at that pixel from the current (i.e. the most recent available) thresholded sensor image, $I_{max}$ is the maximum possible value for a display buffer pixel of maximum intensity, and min(a, b) is a function that provides the minimum of its two arguments. The effect of this simple additive process of accumulation is shown in FIG. 5 as painted stroke 500. In this example both the sensors and display buffer use monochromatic 8 BPP images, such that $I_{max}$ is 255. Unless the object that serves as the painting tool is very small or moves very quickly, this process quickly leads to saturation as the overlapping images soon add up to 255 or more. Because this process allows the current contents of the display buffer to show through the low-valued dark edges of the images of the painting tools, it provides a relatively smooth, anti-aliased edge to the stroke. However, because the min function is nonlinear, the saturated central region does not blend smoothly into the rest of the stroke 500.

In the preferred embodiment, a more linear process is therefore used for painting smooth strokes of a single color. In this process, the value at each pixel of the thresholded sensor image is used as the constant of proportionality in a linear interpolation between the current value of the display buffer at the corresponding pixel and the desired color.

In effect, the sensor image is used as a transparency or alpha mask for compositing a separate image of uniform color with the current image in the display buffer. This process can be represented by the following equation, again executed at each pixel:

$$D_{final} = (1-\alpha) \times D_{current} + \alpha \times C$$

Where α is $S/I_{max}$ and C is the desired color of the stroke. The effect of this compositing process when the desired color is white is shown in FIG. 5 as painted stroke 510. It avoids the abrupt changes that occur using simple addition with saturation seen in stroke 500, while still providing smooth anti-aliased edges, because where the sensor image is darker, the a values are lower, such that more of the pre-existing display buffer image continues to show through.

An alternative accumulative process replaces the single desired color C with a color that varies depending on the brightness of the thresholded sensor image at each pixel. A simple example of such a process is represented by the following equation, again executed at each pixel:

$$D_{final} = (1-\alpha) \times D_{current} + \alpha \times S$$

In that case, the darker outer edges of the thresholded image of the painting tools will be preserved in each stroke, as shown in FIG. 5 as painted stroke 520. That shading adds a three-dimensional quality to the strokes that depends directly on the shape, shading, and texture of the painting tools as well as how they are moved and manipulated by the user while painting.

Note that in all the examples shown in FIG. 5, regardless of the specific function used to accumulate the separate sensor images into strokes, no lines were drawn between those images and no gaps between them were filled. In general, no such extra connecting elements are needed, provided that there is sufficient overlap between successive images or that the partial or complete breakup of strokes into a series of separate spots is not objectionable. The tendency of strokes to break up in that way is dependent on the size and speed of the painting tool, such that it is most likely for small tools moving quickly. It is also dependent on the rate at which new sensor images become available and how quickly they can be processed. In the preferred embodiment new sensor images arrive and are processed at least 60 times per second, such that rapid movements of small painting tools are supported without the strokes breaking up in that way.

Figure 6:
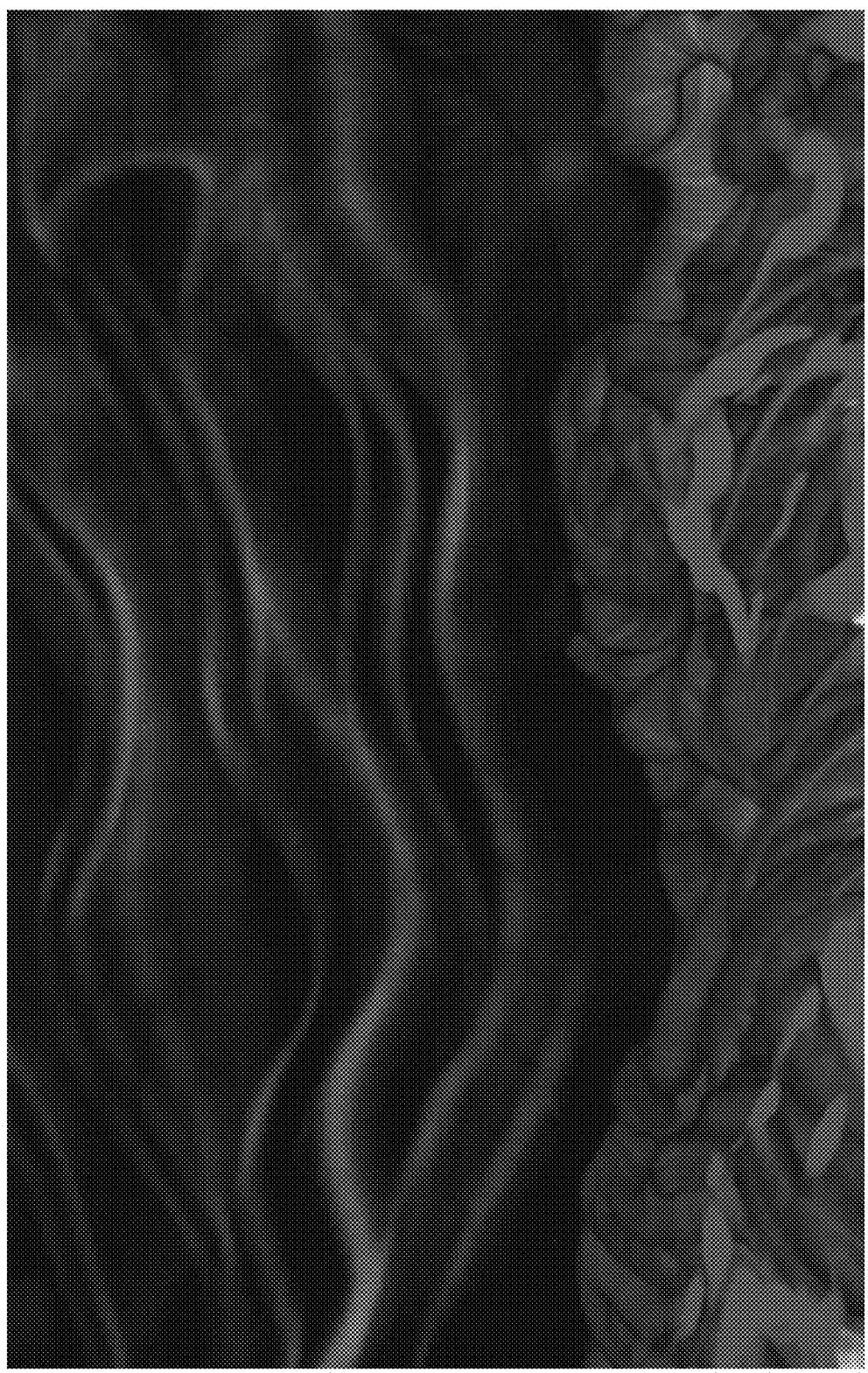
FIG. 6 is an example image produced with the preferred painting method.

Note that the images in FIG. 5 are monochromatic for illustrative purposes. In the preferred embodiment, the full-color display buffer image has 3 separate RGB values at each pixel and the desired color likewise has 3 RGB values, while the monochromatic sensor image has only one value at each pixel. In that case, the accumulative processes just described are performed independently per color channel, with the same sensor value applied separately to each of the three RGB components. For example, FIG. 6 shows a full color painting using all three of the processes described above with reference to FIG. 5.

It will be readily apparent to those skilled in the art that the painted strokes may be any color or combinations of colors that the processor is instructed to associate with particular values or gray levels of the thresholded sensor image and the pre-existing color at the corresponding pixel in the display buffer. Similarly, neighborhood processes may be applied that take into account the values at neighboring pixels in the sensor image and/or the display buffer, to apply, for example, low or high pass filters. Additional independent images and/or processes such as noise generation may also be applied to affect the final color at each pixel. It is therefore possible to combine the natural textures provided by the preferred embodiment with any of the techniques provided by prior art paint systems.

Details of Ghost Image Subtraction

Figure 7:
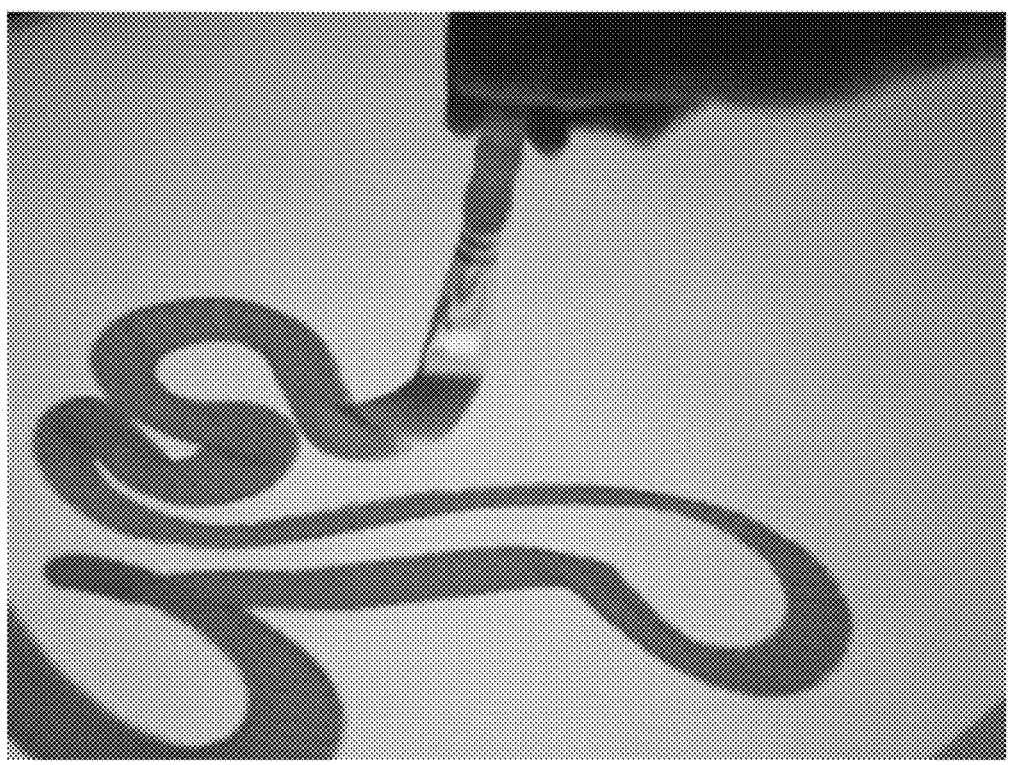
FIG. 7 shows painting input coincident with its display.

The advantages of providing a display in the same location as the sensors that detect the input are primarily that the digital paint appears to flow from the drawing tools themselves as shown in FIG. 7, and that the user can then see where each stroke will begin before beginning it. However, this colocation introduces the problem of ghost images, due to feedback from the display output to the sensor input. That is the case even if the sensors are primarily responsive to invisible wavelengths such as infrared, and the display elements primarily emit or transmit visible wavelengths. It will occur if there is some overlap between the spectra for the light emitted or transmitted by the display elements and the sensors' absorption spectrum, such that the sensors generate at least a small signal when they receive that light. When display elements surround each sensor, as in the preferred embodiment, their light can reach the sensor directly, by reflection from structures internal to the apparatus, and/or by reflection from external objects such as painting tools.

Figure 8A:
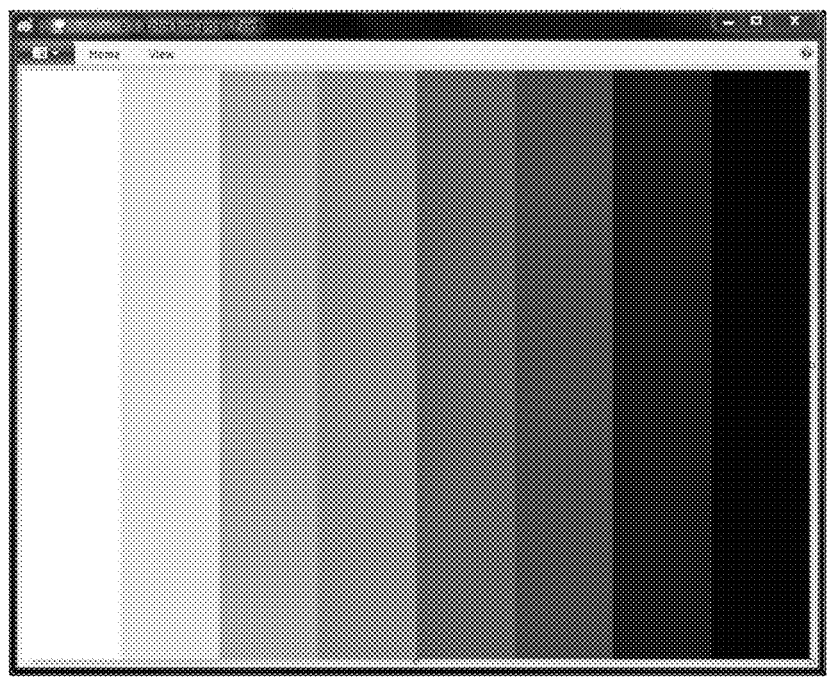
FIGS. 8a and 8b show a test pattern and its ghost image.
Figure 8B:
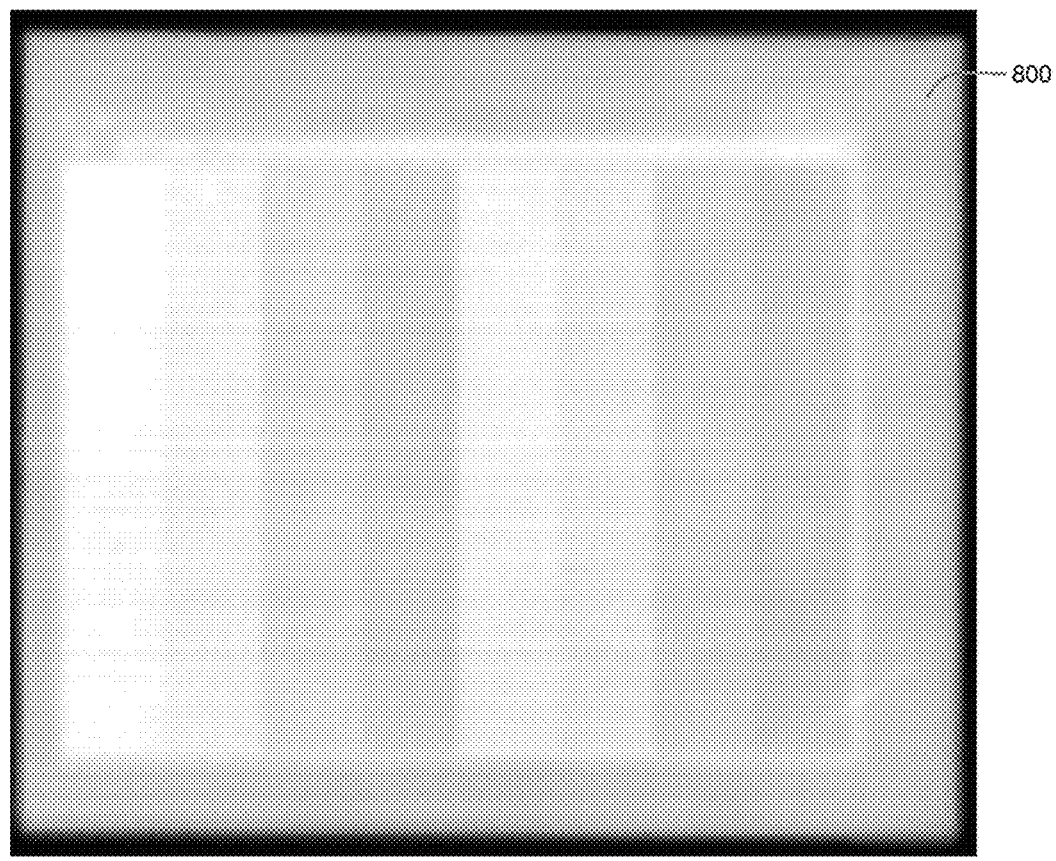

FIG. 8a shows a test pattern or calibration image comprised of bars of each of the primary and secondary colors, at maximum brightness and saturation, as well as black and white. FIG. 8b shows an example ghost image received from the sensors of an SUR40 when it displays the calibration image of FIG. 8a and that portion of the screen is covered by a uniform gray card. The sensor image of the card 800 extends beyond the displayed test pattern, and were it not for the ghost image of the test pattern, that image would be a substantially uniform gray, just like the portions of that image not overlying the displayed test pattern. It is important to understand that no printed copy of the test pattern itself was laid upon the painting surface when the image in FIG. 8b was captured. Thus the ghost image in FIG. 8b is due to feedback from the displayed output, primarily by the reflection of the display's light from the gray card.

As may be seen by comparing FIGS. 8a and 8b, the infrared sensors in the SUR40 are most sensitive to red light, and less to green and blue. The average intensity values of the ghost image of each color bar in the calibration image are shown in Table 1. Again this is a monochrome 8 BPP sensor image, in which any value from 0 to 255 is possible.

TABLE 1

Intensity of Ghost Images of Color Bars

| Bar Color | Average Value | Difference from Black |
| --- | --- | --- |
| white | 246 | 46 |
| yellow | 234 | 34 |
| cyan | 217 | 17 |
| green | 208 | 8 |
| magenta | 234 | 34 |
| red | 226 | 26 |
| blue | 209 | 9 |
| black | 200 | 0 |

It is apparent that the feedback is substantially additive, such that for example, the value relative to black for the magenta bar is approximately equal to the sum of those values for red and blue, and the value for the white bar relative to black is approximately equal to the sum of those values for each of the individual RGB components.

In order to correct for this erroneous feedback, an amount must be subtracted from each raw sensor pixel value proportional to the RGB values in the display buffer for the display elements that surround them. The proportionality constants or coefficients for each color component can be determined from data such as that shown in table 1. Since the display buffer uses 8 BPP for each color component, the maximum red value, used for the red bar in the calibration image, was 255, and its effect on the sensor image was to increase its value from black by 26. Thus a useful coefficient $K_R$ for the red component of a displayed image pixel is 26/255 or approximately 0.102. Similarly useful coefficients $K_G$ and $K_B$ for the green and blue channels respectively are 8/255 and 9/255, or approximately 0.035.

The process for ghost image subtraction 210, before any thresholding is performed, is therefore as follows. For each raw sensor pixel, take the RGB component values of the pixel or pixels in the current image in the display buffer corresponding to the display elements adjacent to or surrounding that sensor pixel. Since in general, not all the surrounding pixels will be displaying the same color, their average is taken, separately for each separate RGB component, respectively $R_{avg}$, $G_{avg}$, and $B_{avg}$. It can be useful to include in that average some display pixels whose display elements are not directly adjacent the sensor, weighted inversely to their distance from that sensor. In other words, a low pass filter can be applied to a plurality of display pixels in the neighborhood of the sensor pixel, to reduce sampling artifacts. Then the following value is subtracted from the raw sensor pixel value:

$$R_{avg} \times K_R + G_{avg} \times K_G + B_{avg} \times K_B$$

While $R_{avg}$, $G_{avg}$, and $B_{avg}$ must be calculated anew for each sensor and display pixel, the coefficients $K_R$, $K_G$, and $K_B$ are constants calculated once, before painting begins, in a calibration procedure similar to the one described above using a single test pattern, or a series of calibration images of different colors. In fact that calibration could be performed semi-automatically as part of the normal SUR40 calibration procedure, in which the display surface is covered by white and black sheets in succession, by displaying a test pattern similar to FIG. 8a and measuring its ghost image in the sensor image. Such a calibration procedure may need to be repeated when changes are made to the display brightness, contrast, and/or the level of ambient illumination.

For sensors and display elements in which the feedback is nonlinear, the constant coefficients can be replaced by other functions, such that the predetermined proportion of the displayed image subtracted from the sensor image is a nonlinear one. A lookup table can be used to implement any such function for ghost image subtraction.

Figure 9A:
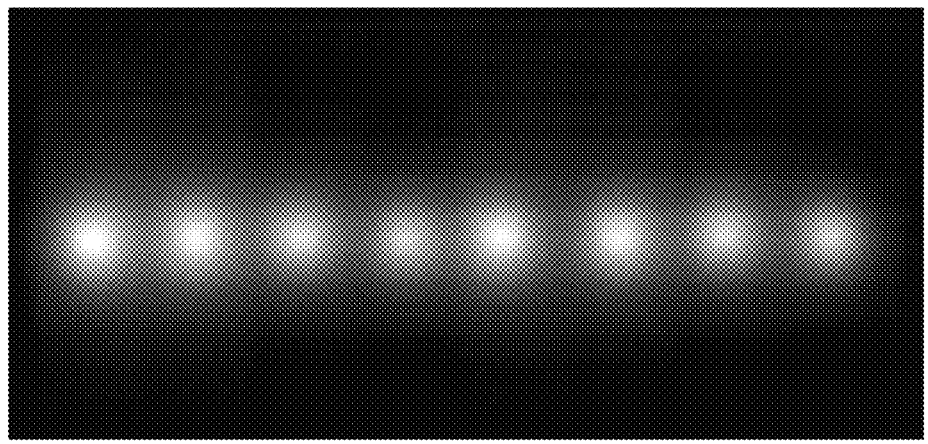
FIGS. 9a, 9b, 9c, and 9d show the effects on the input of ghost images and their subtraction.
Figure 9B:
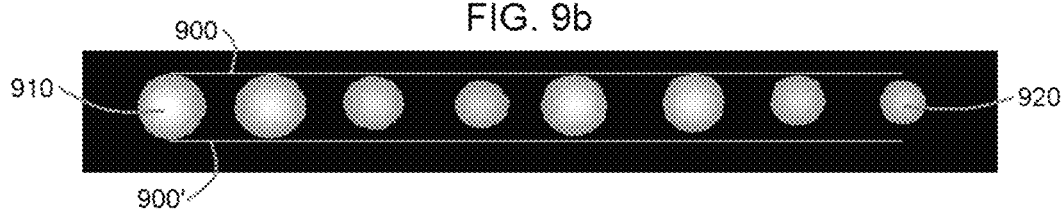

The effects of this feedback on sensor images of painting tools are shown in FIGS. 9a and 9b, which are 8 BPP monochrome sensor images acquired with an SUR40. For those figures, eight identical white styrofoam spheres were placed on the sensitive surface of the SUR40 while it was displaying the same test pattern as in FIG. 8a, with one sphere on each of the differently colored bars. In this case there was no gray card above the test pattern, just the white spheres, so the ghost images of the bars themselves are only slightly visible above and below the row of images of the spheres in FIG. 9a. In FIG. 9b, the sensor image is thresholded at a gray level of 128. Witness lines 900 and 900' are placed at the diameter of the thresholded image 910 of the leftmost sphere, which was the sphere placed on the white bar of the test pattern. Note that due to feedback from the display of that white bar, that diameter is greater than that of the thresholded images of the other spheres. The thresholded image of the rightmost sphere 920, which was placed on the black bar of the test pattern, has the smallest diameter because little or no light was provided by the display there, such that there was little or no feedback.

Figure 9C:
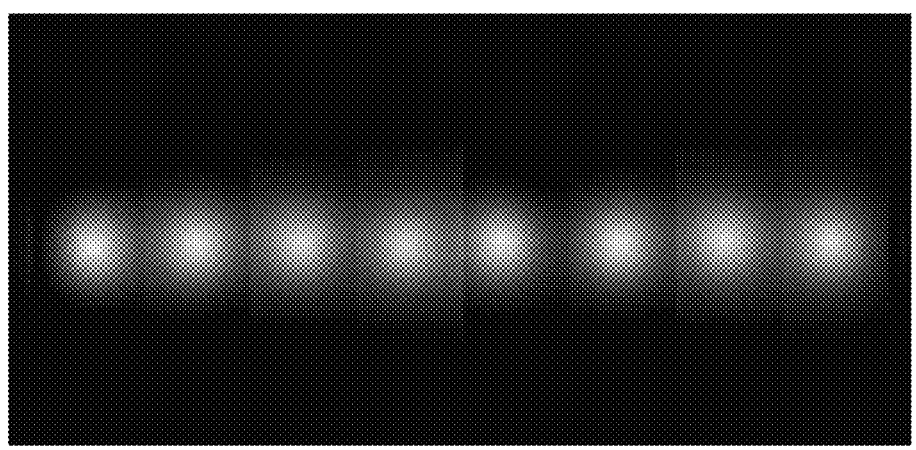
Figure 9D:
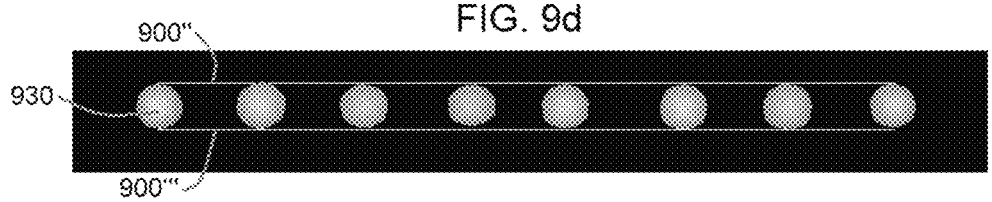

The effects of ghost image subtraction on sensor images of painting tools are shown in FIGS. 9c and 9d. FIG. 9c is a sensor image acquired under the same circumstances as FIG. 9a, with the same spheres, except that at every pixel, the RGB values of the displayed image were multiplied by the constant coefficient values given above and their sum was subtracted from the sensor image. Note that the ghost images that are visible in FIG. 9a above and below the row of sphere images have been completely removed in FIG. 9c. In FIG. 9d, the sensor image is again thresholded at a gray level of 128, but this time following ghost image subtraction. Witness lines 900" and 900'" are again placed at the diameter of the ghost-subtracted and thresholded image 930 of the leftmost sphere. Note that the thresholded images now have approximately the same diameter, regardless of the color bar displayed at each position, because the ghost image was substantially removed before thresholding. That more uniform sensitivity allows a lower threshold to be applied, preserving more of the dynamic range of the sensor image, because the threshold then doesn't need to be raised to accommodate the higher background levels produced by feedback where the display is brighter and/or redder.

Figure 10:
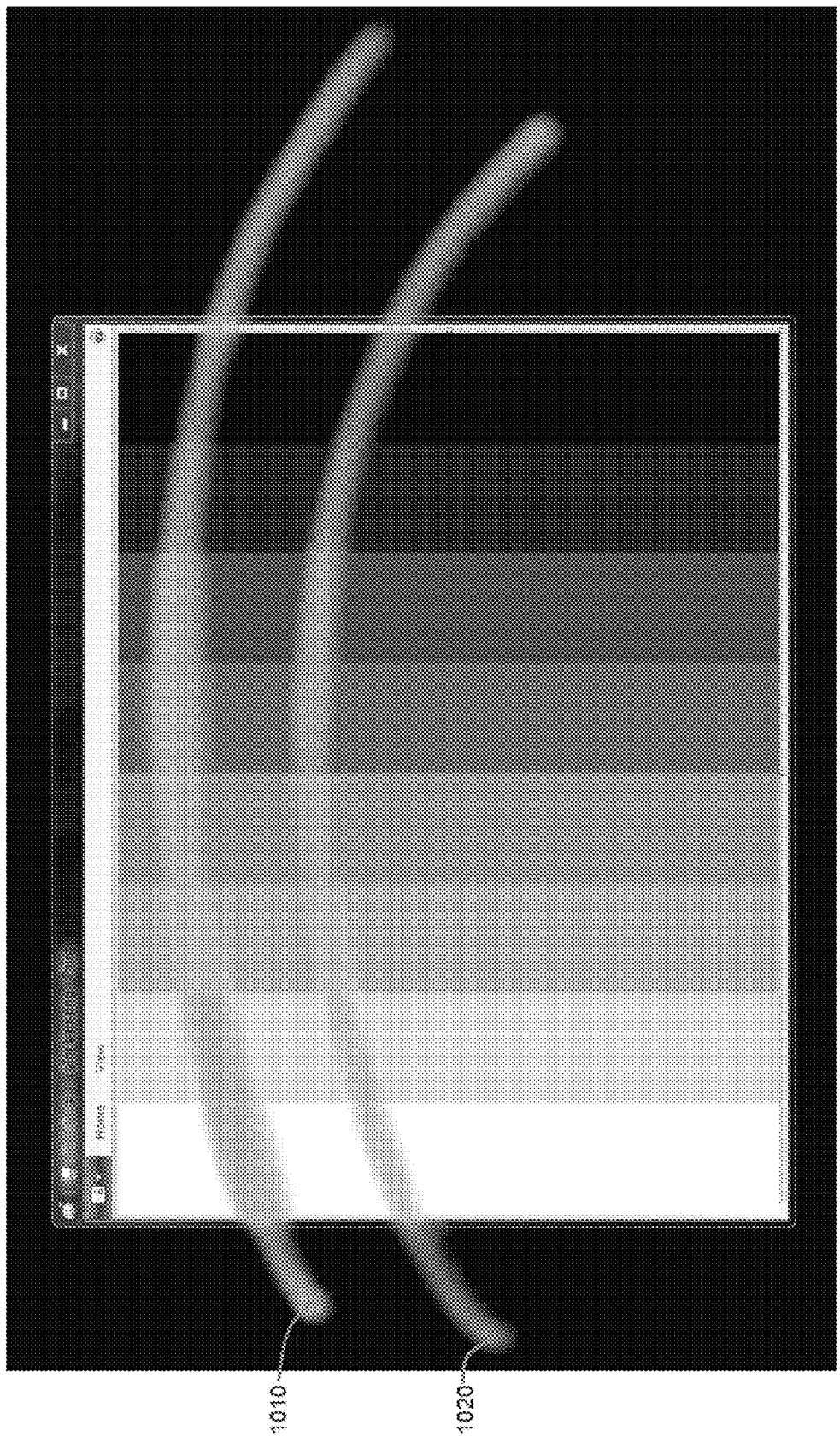
FIG. 10 shows the effects on the painted output of ghost images and their subtraction.

The effects of ghost images and their subtraction on painted strokes in the final painted image are shown in FIG. 10. In this case, one of the same spheres that were used to generate FIGS. 9a-d was moved across the painting surface and the successive images were accumulated using the preferred linear compositing process described above. The same test pattern as shown in FIG. 8a was displayed as part of the original image to be painted upon, so that the stroke would traverse the full range of colors that it shows. For the upper stroke 1010, no ghost image subtraction was applied. Note that the width of the stroke increases where it crosses the brighter and redder colors, even though the sphere that served as a painting tool did not substantially change its velocity or pressure against the painting surface during the stroke. Instead, those differences in width are erroneous artifacts of feedback from the display, just as in FIG. 9b. For the lower stroke 1020, the same ghost image subtraction was applied as for FIG. 9d. Note that the width of the stroke is more uniform because the feedback from the display has been substantially reduced or removed.

While there is significant prior art related to background subtraction in the field of image processing, the ghost image subtraction described above is a different process, particularly suited to the preferred embodiment of the present invention. In the prior art, a background image is captured and then subtracted from subsequent images, in order to regard as signals only those parts of the image that changed after the background was acquired. In the present invention, that would be ineffective because not only do moving drawing tools provide changes from an initial background sensor image, but there are also simultaneous changes due to the unwanted feedback from the changing displayed image. In other words, such prior art background subtraction would regard both the moving painting tools and the changing ghost images as signals, even though in the present invention the ghost images are undesirable noise. Nor can successive new background sensor images be acquired that only include the ghost images, because that background changes with every newly painted pixel, which means these sensor images would also include the painting tool, such that both tool and ghost would then be discarded as noise. Therefore the ghost images to be subtracted in the present invention are calculated rather than acquired. The calculation is based on the known contents of the display buffer at any time and the known coefficients of feedback, where those coefficients are predetermined from measurements obtained during calibration prior to painting.

Figure 11A:
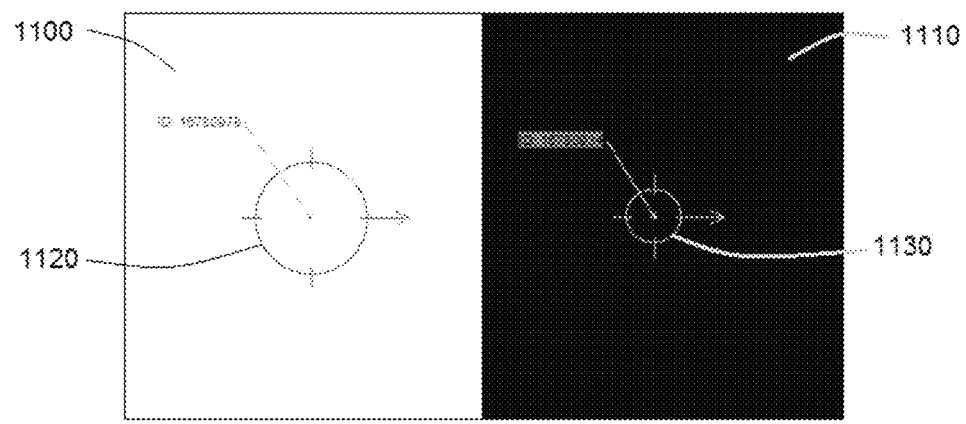
FIGS. 11a and 11b show the effects of ghost images on prior art processing.

The ghost images in an SUR40 also degrade the detection of touches and other input by making its sensitivity nonuniform. FIG. 11a shows the effect of this erroneous feedback on the determination of the ellipses that approximate the images of objects near its sensitive surface in the prior art. A white styrofoam sphere was placed on that surface where white was being displayed 1100, and a second identical sphere was placed on that surface where black was being displayed 1110. The room was otherwise darkened and the SDK's Input Visualizer tool was again used to show the approximating ellipses determined by the prior art processing for the image of each sphere. The ellipse 1120 calculated for the sphere on the brighter portion of the display is more than twice as large as the ellipse 1130 for the sphere on the darker portion, because of the brighter display illumination feeding back by reflection from the sphere into the sensors, i.e. because of the ghost image there.

Figure 11B:
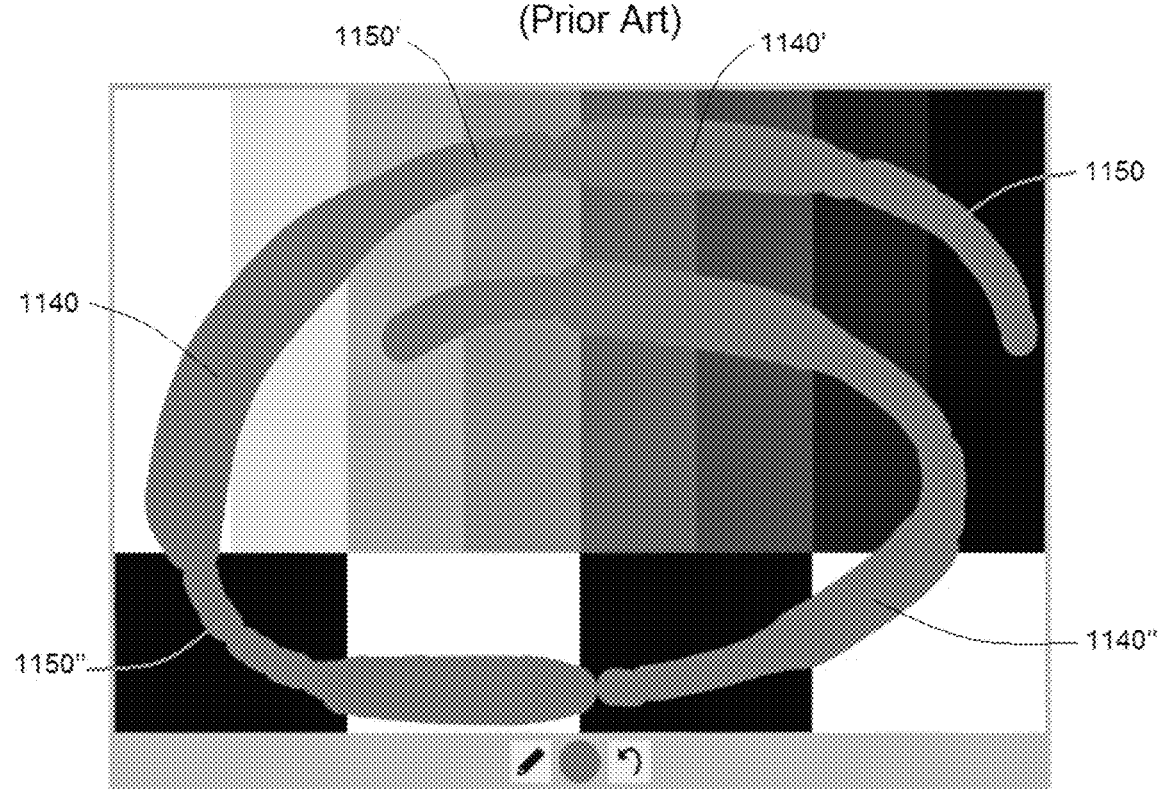

FIG. 11b shows the effects of the ghost images on prior art paint processing that uses those approximating ellipses, as previously described with respect to FIGS. 4a and 4b. For FIG. 11b the PhotoPaint example from the SDK was again used, modified only to provide a multicolored image upon which to paint. A white styrofoam sphere was again used as the painting tool, and the stroke was made with approximately constant velocity and pressure. The effects of the feedback from the display are visible in the increased width of the stroke at places such as 1140, 1140', and 1140", where it overlies the brighter and redder portions of the displayed image, as compared to places such as 1150, 1150', and 1150" where the underlying displayed image was darker and less red.

In the preferred embodiment of the invention, the ghost image subtraction process described above is applied to the sensor image before it is segmented and approximated by ellipses, such that its sensitivity is more uniform and independent of the displayed images.

While the preferred embodiments of the method and apparatus for digital painting with natural textures have been disclosed, since different implementations of the invention may be preferred by others, and since modifications will naturally occur to those skilled in this art, the scope of the invention should not be interpreted as limited to the illustrated or described embodiments.

I claim:

1. A method of digital painting using a system that has a multiplicity of light sensors that provide signals in direct relation to the amount of light they receive, a transparent material disposed adjacent to said sensors with one surface thereof defining a painting surface, a source of infrared light disposed adjacent to said sensors, whereby an object in proximity to said painting surface will reflect an amount of infrared light from said source to said sensors in inverse relation to the distance of said object from said painting surface, a buffer that stores an image providing at least one pixel for each of said sensors, a multiplicity of display elements emitting visible light disposed adjacent to said sensors, whereby said image is displayed, and a processor that receives said displayed image and said signals from said sensors, comprising:

(a) calculating expected amounts of feedback errors in a predetermined proportion to one or more of the values stored in said buffer for said display elements adjacent to each of said sensors for which reduction of said feedback error is desired, wherein said feedback errors are caused by the known variations in the intensity of said visible light emitted from said display elements and received by said sensors and by the known sensitivity of said sensors to said visible light, whereby said expected amounts of feedback errors are calculated from said known display intensity variations and said known sensitivity, (b) subtracting said calculated expected amounts of feedback errors from said signals generated by said sensors, (c) retaining only said signals exceeding a threshold selected to detect only the portions of said object substantially in contact with said painting surface, (d) accumulating over time the remaining said signals in said buffer, whereby the error in said signals caused by feedback from said visible light emitted by said display elements is reduced, and a composite image influenced by the texture of said object in contact with said surface is stored in said buffer.

2. The method of claim 1 further comprising:
(a) displaying one or more calibration images in said buffer,
(b) measuring said feedback errors from one or more portions of said calibration images,
(c) determining said proportion by relating said feedback errors to the values in said buffer for said portions of said calibration images.

3. A method of input error correction in a graphic input and output device that has a multiplicity of light sensors and a source of infrared light so disposed as to provide input images of objects disposed adjacent to said sensors, a multiplicity of display elements providing a display in visible light of output images disposed adjacent to said sensors, whereby said display is substantially coincident with said sensors, and a processor receiving said input images and said output images, comprising:

(a) calculating expected feedback error images in a predetermined proportion to one or more of the values in said output images for said display elements adjacent to each of said sensors for which reduction of said feedback error is desired, wherein said feedback error is caused by the known variations in the intensity of said visible light emitted from said display elements and received by said sensors and by the known sensitivity of said sensors to said visible light, whereby said expected feedback error images are calculated from said known display intensity variations and said known sensitivity, (b) subtracting from said input images said calculated expected feedback error images, whereby the error in said input images caused by feedback from said visible light from said display is reduced.

4. The method of claim 3 further comprising:
(a) displaying one or more calibration images on said display,
(b) measuring said error from one or more portions of said calibration images,
(c) determining said proportion by relating said error to the values in said portions of said calibration images.

* * * * *